Jan. 17, 1956  A. M. CHAMBERS, JR., ET AL  2,731,284
SEALING DEVICES
Filed Dec. 5, 1952
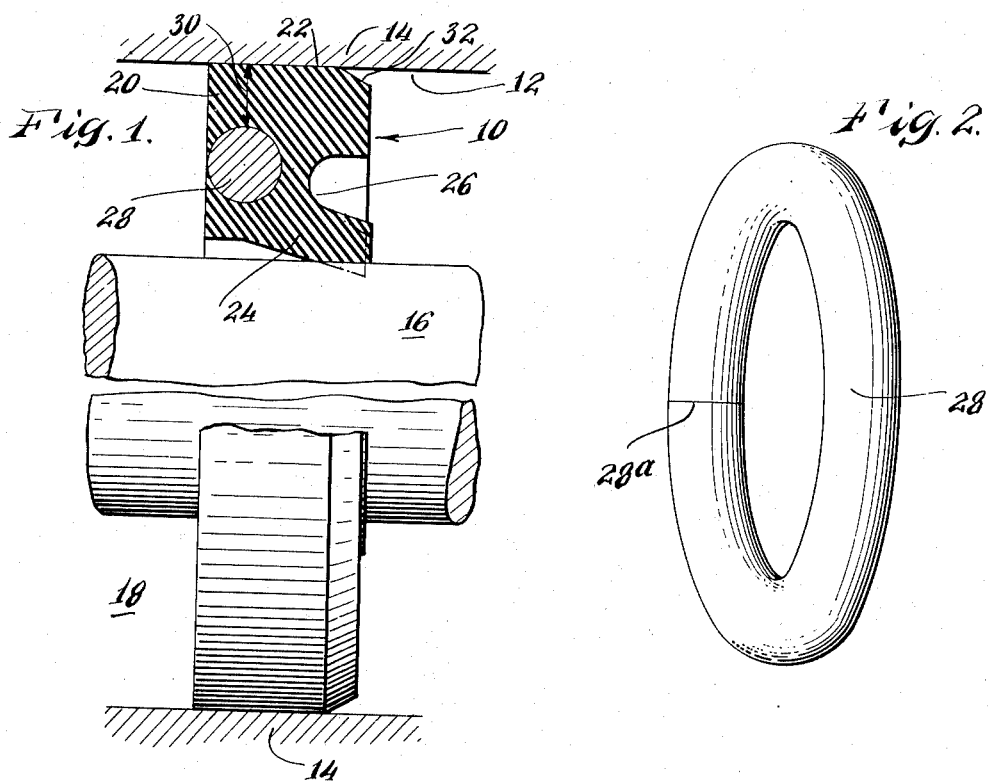
INVENTORS.
Albert M. Chambers, Jr.
BY Edward W. Fisher
Robert Henderson
ATTORNEY.

United States Patent Office 2,731,284
Patented Jan. 17, 1956

2,731,284
SEALING DEVICES

Albert M. Chambers, Jr., and Edward W. Fisher, Palmyra, N. Y., assignors to The Garlock Packing Company, Palmyra, N. Y., a corporation of New York Application December 5, 1952, Serial No. 324,318

1 Claim. (Cl. 288—11)

The present invention relates to sealing devices which are formed almost entirely of rubber or equivalent rubber-like material and which, when installed in a machine for sealing a shaft, effect a rubber-to-metal sealing contact with a surface defining a shaft opening in the machine casing and/or with the surface of the shaft. More particularly, as described herein for illustrative purposes, the invention is directed to improved pressure reaction or reinforcing means in an oil seal by which the device is designed to seat more firmly within a shaft opening.

In recent years, in providing oil seals for certain purposes, it has been found possible to omit the more or less conventional metal shell within which the rubber sealing element of the device has been disposed. In omitting the metal shell and providing for the rubber of the sealing element to be held in firm engagement with the wall of the shaft opening, it has been necessary to provide some support in the seal in order to compress or hold the rubber mounting portion of the sealing element firmly against said wall. For this purpose, it has been proposed to embed a rigid, cylindrical, metal, reinforcing ring within the mounting portion of the sealing element and to form the oil seal of such outside diameter that it must be squeezed into the shaft opening. Under this arrangement, the peripheral rubber of the device very tightly engages the wall of the shaft opening whereby the seal is not only held very firmly therein against dislodgment but also effectively seals against leakage of fluid along said wall.

When such rigid, cylindrical reinforcing rings are employed, it is quite important that the outside diameter of the sealing device be only slightly larger than the diameter of the shaft opening into which it is to be inserted as otherwise it might be very difficult to force the sealing device into said opening. Thus, as a practical matter, such oil seals are made to particular sizes for certain sizes of openings with little or no latitude which would enable an oil seal of a given size to be utilized in any one of several openings of slightly different sizes.

It is an important object of the present invention to provide such an oil seal with an embedded or partially embedded reinforcing ring of such character that while it serves adequately to press the rubber periphery of the oil seal against the wall of the shaft opening, it, nevertheless, allows sufficient flow of the surrounding rubber to enable a seal of a given size to be utilized in shaft openings of somewhat different sizes.

Another important object is the provision of an oil seal having a reinforcing ring which may be more economically produced than a cylindrical reinforcing ring.

Another important object is the provision of an oil seal having a reinforcing ring which, in the finished product, may lie adjacent to a wall of the sealing device but, nevertheless, be firmly held within the rubber constituting the device. The accomplishment of this objective makes it possible to locate and hold the reinforcing ring in a definite position within the mold when the device is being formed.

Although the principles of this invention may be embodied in numerous variations of sealing devices, nevertheless, for illustrative purposes and without limiting the invention thereto, the present invention has been illustrated in the accompanying drawing in only a single embodiment.

In the drawing:

Figure 1 is a side view of an oil seal according to the present invention, shown in association with a shaft mounted in a shaft opening in a surrounding machine casing; the upper half of this figure being shown in axial section and the lower half in side elevation.

Fig. 2 is a perspective view of a metal reinforcing ring such as is employed in the structure of Fig. 1.

In Fig. 1, there is illustrated an oil seal generally indicated at 10, fixedly mounted in a cylindrical wall 12 of a machine casing 14, which wall defines an opening through which extends a rotatable shaft 16. The purpose of the oil seal 10 is to prevent the escape of lubricant along the shaft 16 through the annular space 18 between the shaft and the wall 12.

The oil seal 10 preferably is formed almost entirely of rubber or synthetic rubber or other rubber-like material, all of which for the purpose of the present application are herein referred to for convenience merely as rubber. The rubber portion of the seal consists of an outer, rather massive mounting portion 20, the outer cylindrical wall 22 of which seats within and tightly against the cylindrical wall 12 defining the shaft opening in the machine casing.

Integral with the mounting portion 20 is an inner, axially extending, flexible sealing flange 24, which is given its form as a flange by an annular, axially facing groove 26, formed in one side of the seal. This flange is molded to the shape and size shown in the drawing in broken lines.

The seal is mounted in place in the machine by being pushed axially onto the shaft and into the shaft opening. As the flange 24 is formed of an inside diameter which, normally or in the unflexed condition of the flange, is less than the diameter of the shaft, it follows that when the oil seal is pushed into place, the sealing flange 24 expands to the position thereof shown in full lines in the drawing. This outward spreading sets up a reaction in the body of the rubber constituting the flange to cause the latter to engage the shaft tighly, but slidably, to prevent the leakage of lubricant therealong past the seal.

When the sealing device is pushed into place on the shaft and within the shaft opening of the machine casing which is of somewhat smaller diameter than the outside diameter of the oil seal in its normal or unflexed condition, the mounting portion 20 of the device becomes deformed to the diameter of the cylindrical wall 12, and this deformation sets up a reaction in the rubber which tends to cause the oil seal to be held in place in the shaft opening.

It is desirable, however, to provide that the fit of the mounting portion 20 with the wall 12 shall be very tight, not only to prevent leakage of lubricant along said wall and past the seal but also to assure that once the seal is in position in the machine casing it will stay in that position.

For this purpose, there is embedded, within the rubber body of the sealing device, a metal reinforcing ring 28 formed from wire material which, advantageously, is circular in cross-section. This ring may either be a continuous or unbroken ring or it may be a split ring the ends of which may come together as at 28a in Fig. 2. Such a ring, of course, is molded into the rubber constituting the sealing device when the latter is being formed.

In use, the ring 28 enhances the engagement of the rubber mounting portion 20 with the cylindrical wall 12 by reason of the fact that, as the sealing device is normally or in its undeformed condition of an outside diameter greater than the diameter of the cylindrical wall 12, the ring 28 serves to compress the rubber mounting portion 20 radially at all points about said ring, this compression being localized chiefly in a radial plane indicated by the double-headed arrow 30.

The compression of the rubber at the plane of the arrow 30, however, is not the sort of restricted compression that would result if the ring 28 were cylindrical rather than round in cross-section. The reason for this is that, because of the round cross-sectional shape of the ring 28, there is an appreciable flow of rubber from plane 30 as a result of such compression, more particularly to points adjacent to and at each side of said plane. This flow is in an axial direction and to some extent relieves the compressive effect of the ring 28 upon the rubber of the mounting portion while, nevertheless, holding the oil seal in the shaft opening against dislodgment and leakage. This flow, therefore, permits an oil seal of a given normal or unstressed outside diameter to be used in at least several different sizes of machine-casing openings.

If the seal is inserted into a relatively small shaft opening which is only slightly less in diameter than the outside diameter of the mounting portion 20, the mounting portion would undergo only slight but, nevertheless, sufficient deformation to hold it in place satisfactorily in the shaft opening. On the other hand, if the same oil seal were to be used in a somewhat smaller shaft opening, it could be forced thereinto because of the fact that the rubber would be able readily to flow axially, as hereinbefore described, because of the fact that the ring 28 is circular in radial section rather than of cylindrical shape.

The structure shown in Fig. 1 is particularly useful where the oil seal is one which is of very small dimension radially. In the manufacture of such a seal it is only necessary to drop the metal ring into the mold and because of the small radial dimension and the natural tendency of the rubber to flow completely about the ring, the latter will be sufficiently well centered for all practical purposes. The device, of course, is considerably enlarged in the drawing and there appears to be a very considerable mass of rubber both around the exterior and around the interior of the ring 28, but in an actual device that mass is not very considerable and if the ring 28 should be slightly off center in the mold, no harm would be done and the device, despite such slight eccentric positioning of the ring, would nevertheless function satisfactorily.

The device ordinarily is pushed into place in the annular space 18 by being slipped axially rightwardly, as viewed in Fig. 1, over the shaft 16 and into said annular space or shaft opening. In thus inserting the oil seal, a special tool usually is provided to guide the sealing lip onto the shaft without damaging the sealing lip. To aid further in the insertion of the seal, the mounting portion 20 may be formed with a bevel 32 at the leading outer peripheral edge of the device. The diameter of this bevel, at its leading edge, ordinarily would be less than the inside diameter of the cylindrical wall 12, so that the device is very easily started into the shaft opening.

Although in the embodiment described and illustrated herein, the sealing device is mounted fixedly within a shaft opening and has an inner peripheral portion in sliding sealing engagement with a shaft extending through said opening, it should be understood that, within this invention, the sealing device may be adapted to be fixedly mounted on a shaft to turn therewith and to have an outer peripheral portion in sliding sealing engagement with the cylindrical wall defining the shaft opening. In the latter arrangement, the reinforcing ring would serve to compress a body of rubber of an inner peripheral mounting portion between said ring and the shaft.

It will be perceived from the foregoing that the present invention may be utilized in many other ways than those shown and described herein, without departing from the spirit of the invention as defined in the following claim.

We claim:

A sealing device for effecting a seal between a machine casing and a shaft which extends through a shaft opening in said casing and is rotatable relatively to the latter, the said device comprising a continuous annular, cross-sectionally deformable, rubber mounting portion having an outer peripheral surface adapted to fixedly engage and effect a seal with an opposed cylindrical surface of said machine casing, an annular sealing portion extending radially inwardly from said mounting portion and adapted to effect a sliding seal with a surface associated with and turning with the shaft, and a reinforcing ring, of a single, substantially complete, non-continuous turn of material of substantially circular shape in cross section and split at one circumferential point with the ends thereof in intimate, face-to-face relationship, said reinforcing ring being fixedly embedded within the rubber constituting said mounting portion with a portion of the latter's rubber intervening between the reinforcing ring and said outer peripheral surface, said reinforcing ring being substantially non-resilient cicumferentially and adapted, in use, to compress such intervening rubber between it and said cylindrical surface.

References Cited in the file of this patent

UNITED STATES PATENTS

| | | |
|---|---|---|
| 1,553,460 | Mowrey et al. | Sept. 15, 1925 |
| 1,854,708 | Mastin et al. | Apr. 19, 1932 |
| 2,145,597 | Hait | Jan. 31, 1939 |
| 2,162,104 | Mosher | June 13, 1939 |
| 2,173,247 | Bott | Sept. 19, 1939 |
| 2,230,510 | Lignian et al. | Feb. 4, 1941 |
| 2,294,105 | Wallgren | Aug. 25, 1942 |

FOREIGN PATENTS

| | | |
|---|---|---|
| 591,698 | Great Britain | Aug. 26, 1947 |